United States Patent [19]

Järvenpää

[11] Patent Number: 4,478,616
[45] Date of Patent: Oct. 23, 1984

[54] APPARATUS FOR REMOVING GASEOUS COMPONENTS AND/OR SOLID IMPURITIES FROM A GASEOUS FLUID FLOW

[76] Inventor: Viljo J. Järvenpää, Vellamontie 21, 04200 Kerava, Finland

[21] Appl. No.: 409,533

[22] Filed: Aug. 19, 1982

[51] Int. Cl.³ .............................................. B01D 47/16
[52] U.S. Cl. ........................................ 55/223; 55/235; 55/257 C; 55/258; 55/260; 261/79 A; 261/89
[58] Field of Search .................. 55/223, 226, 230, 235, 55/257 C, 258, 260; 261/79 A, 89, 118, 126, D1G. 54, 117

[56] References Cited

U.S. PATENT DOCUMENTS

| | | | |
|---|---|---|---|
| 321,338 | 6/1885 | Burk | 261/117 |
| 2,601,519 | 6/1952 | Hardy et al. | 55/230 |
| 2,763,982 | 9/1956 | Dega | 55/257 C |
| 3,191,364 | 6/1965 | Sylvan | 55/257 C |
| 3,334,470 | 8/1967 | Hupke | 261/DIG. 54 |
| 3,336,733 | 8/1967 | Wisting | 261/89 |
| 3,693,326 | 9/1972 | Deane | 55/230 |
| 3,895,926 | 7/1975 | Lerner | 55/260 |
| 4,116,647 | 9/1978 | Garner | 55/223 |
| 4,171,960 | 10/1979 | Järvenpää | 55/230 |
| 4,192,833 | 3/1980 | Hashimoto et al. | 261/117 |

FOREIGN PATENT DOCUMENTS 58935  9/1982  European Pat. Off. ............. 261/89

*Primary Examiner*—David L. Lacey
*Attorney, Agent, or Firm*—Steinberg & Raskin

[57] ABSTRACT

Apparatus for removing gaseous components and/or solid impurities from a gaseous fluid flow includes a frame structure in which are disposed a fluid flow inlet connector through which the gaseous fluid flow is charged into the frame structure, a scrubber, a discharge connector through which the purified fluid flow is discharged from the frame structure and a connector through which scrubbing liquid is introduced into the apparatus and contacted with the fluid flow. The fluid flow inlet connector has an end region adjacent to the scrubber which diminishes in cross-sectional diameter for accelerating the velocity of the gaseous fluid flow prior to the latter entering the scrubber and is also provided with openings through which a return flow of the scrubbing liquid can enter into the inlet connector, the openings being formed in a region of the inlet connector where the velocity of the fluid flow remains unaccelerated and shaped and disposed to direct the scrubbing liquid return flow in said inlet connector in a direction opposite to the direction of gaseous fluid flow so that the scrubbing liquid return flow is prevented from being entrained with the fluid flow. In this manner the scrubbing liquid return flow passes through the inlet connector in a direction opposite to the direction of the fluid flow to accomplish a pre-purification thereof.

6 Claims, 1 Drawing Figure

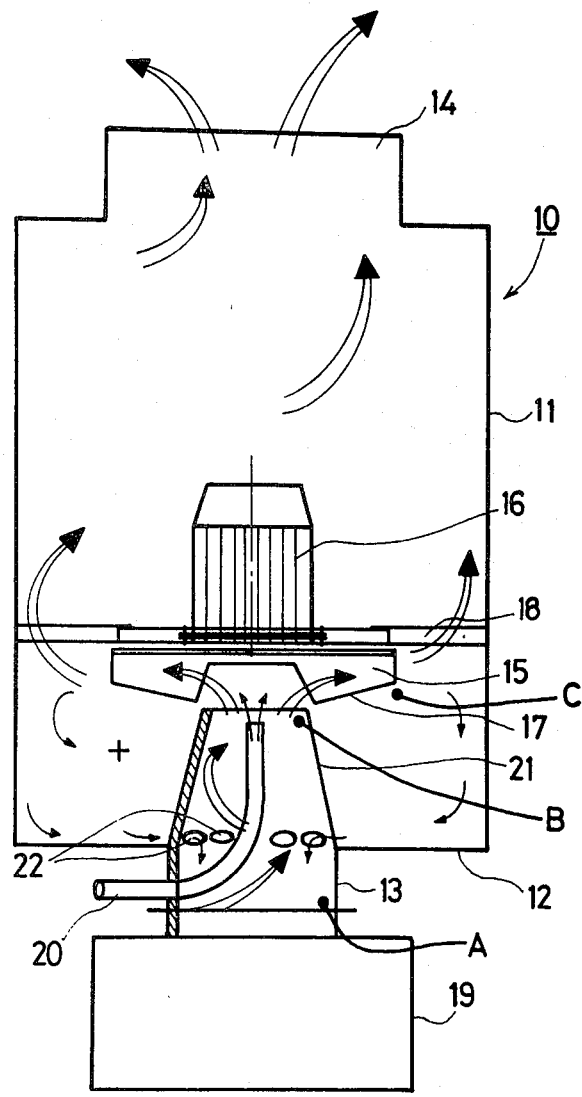

APPARATUS FOR REMOVING GASEOUS COMPONENTS AND/OR SOLID IMPURITIES FROM A GASEOUS FLUID FLOW

BACKGROUND OF THE INVENTION

The present invention relates to apparatus for removing gaseous components and/or solid impurities from a gaseous fluid flow and, more particularly, to apparatus incorporating scrubbing means which serve to wash away any gaseous or solid impurities present in the gaseous fluid flow.

Gaseous fluid flows frequently contain impurities both in the form of gaseous components and solid particles which must be removed prior to further processing and use of the fluid flow.

Various apparatus are known by which gaseous fluid flows, such as coal gas or other gases, are washed or scrubbed to remove such impurities. One type of such apparatus includes a frame structure in which are accommodated an inlet connector through which the gaseous fluid flow is charged into the apparatus, a discharge connector through which the purified fluid flow is discharged from the apparatus, scrubber means for washing the gaseous fluid flow and a connector for conducting a scrubbing liquid into the apparatus so that the same contacts the gaseous fluid flow.

In practice, the gaseous fluid flow frequently contains solid impurities in such large quantities that their separation from the fluid flow before the latter reaches the scrubber means is desirable. Thus, it is common under usual conditions to purify a gaseous fluid flow using a wet scrubber wherein the gaseous fluid flow is conducted into a frame portion of a separator, i.e., into a fluid tank or reaction chamber, wherein intimate contact between the scrubbing liquid and the gaseous fluid flow is attempted to be maximized. At least part of the coarser fraction of the solid matter impurities will separate from the gaseous fluid flow during this scrubbing phase and remain in the separating tank.

However, it is most desirable to separate the greater part of the solid matter impurities from the gaseous fluid flow prior to the scrubbing phase while in a dry state and attempts have been made to achieve this action in either a settling chamber or in a cyclone separator. This technique is advantageous in that the quantity of solid impurities which are carried into the scrubbing liquid is minimized so that the amount of sludge which is created during the scrubbing phase and which must be removed from the apparatus will be maintained at a minimum. Moreover, since a blower is usually provided after the scrubber, this technique also advantageously reduces wearing of the blower. A droplet separator generally is provided following the blower and depending upon the particular application may be constituted by a grille, a set of gratings, droplet separators of the cyclone separator type, various rotating and round towers, and the like.

In conventional scrubbers known in the art, the blower is usually similar to a conventional centrifugal blower. A so-called disintegrator type blower is also known in the art into which the gaseous fluid flow with its impurities together with the scrubbing liquid are directed. Such designs require a high power input from a drive and, moreover, the blower is subject to a high rate of wear.

In scrubbers of the venturi type, the gaseous fluid flow together with the impurities contained therein are accelerated in a venturi section to obtain a high velocity and at the same time the scrubbing liquid is introduced into the accelerated fluid flow. After passing through the venturi section, the gaseous fluid flow with a reduced flow velocity is acted on by a droplet separator where the impurities will serve as crystallization nuclei.

So called S-wave scrubbers have also been utilized in connection with the purification of gaseous fluid flows. In such arrangements, the gaseous fluid flow together with a scrubbing liquid flows through an S-wave shaped slit to enter into a free space from where it is directed into a blower. In such arrangements, there is no separate droplet separator, the separation of droplets taking place in the free space after the S-wave scrubber and before the blower. However, a risk exists in this arrangement that supercondensing moisture may be entrained with the gaseous fluid flow with droplets then being flung outwardly into the surrounding areas.

SUMMARY OF THE INVENTION

Accordingly, it is an object of the present invention to provide a new and improved apparatus for removing gaseous components and/or solid impurities from a gaseous fluid flow.

Another object of the present invention is to provide a new and improved scrubber-type apparatus for removing impurities from a gaseous fluid flow wherein a high scrubbing efficiency is attained without the need for a high energy input to the scrubber.

Briefly, in accordance with the present invention these and other objects are attained by providing apparatus including an inlet connector through which a gaseous fluid flow is directed and scrubber means adjacent to an end region of the inlet connector. The end region of the inlet connector adjacent to the scrubber means has a diminishing cross-sectional diameter which functions to accelerate the velocity of the fluid flow passing through the inlet connector before it enters the scrubber means. The inlet connector is provided with openings through which the return flow of the scrubbing liquid passes into the inlet connector, the openings being disposed in a region of the inlet connector where the velocity of the fluid flow is not accelerated. In this manner the return flow of the scrubbing liquid passing through the inlet connector is prevented from becoming entrained with the gaseous fluid flow so as to provide an efficient pre-purification of the fluid flow.

Numerous significant advantages are obtained by the apparatus of the present invention. Thus, the apparatus of the invention provides an efficient pre-purification of the gaseous fluid flow so that only gas which has already been nearly purified will be carried to the final scrubbing with only a minimal quantity of scrubbing liquid. It follows that the solid matter content of the gaseous fluid flow which is subjected to the scrubbing operation will be minimal. This advantageous results in eliminating all of the practical problems discussed above inherent in conventional apparatus.

For example, when the scrubber means are constituted by blower means, the latter can be run with relatively low outputs thereby reducing power requirements while at the same time still attaining maximum venturi action. In other words, a high scrubbing efficiency is obtained with high velocities of the gaseous fluid flow, approaching up to about 60-100 meters per second. The velocity of the gaseous fluid flow is subsequently reduced sufficiently to separate liquid droplets from the gaseous fluid flow which then run downwardly along the walls to the bottom of the frame structure and then into the inlet connector through the openings formed therein for pre-purification of the gaseous fluid flow. In a typical embodiment of the present invention, energy requirements as low as 1 HP per 1000 m$^3$/hr of gaseous fluid flow to be washed is achieved. The efficiency of the blower means constituting the scrubber will be about 74%.

DESCRIPTION OF THE DRAWING

A more complete appreciation of the present invention and many of the attendant advantages thereof will be readily understood by reference to the following detailed description when considered in connection with the accompanying drawing in which the sole FIGURE is a schematic elevational view of a preferred embodiment of the apparatus of the invention.

DESCRIPTION OF THE PREFERRED EMBODIMENT

Referring now to the drawing, the apparatus of the present invention, generally designated 10, comprises a frame structure including a cowl-like upstanding wall 11 and bottom 12 in which are disposed a fluid flow inlet connector 13, scrubber means 15, a discharge connector 14 through which the purified fluid flow is discharged from the frame structure, and a connector 20 for introducing scrubbing liquid into the apparatus 10 for bringing the same into contact with the gaseous fluid flow. In the illustrated embodiment, a pretreatment section 19 is provided through which the gaseous fluid flow passes and from which it enters into the inlet connector 13. In this manner, the gaseous fluid flow is already pre-purified to some extent as it flows into the apparatus 10. The pretreatment section 19 may comprise, for example, a cyclone separator, scrubbing tube or other conventional apparatus known per se in the art. The gaseous fluid flow with its non-abrasive impurities is conducted from the pretreatment section 19 in a rotary motion about a vertical axis into the inlet connector 13.

In the illustrated embodiment, the scrubber means is constituted by blower means 15 adapted to be driven by a motor 16 and the impeller of the blower means 15 may be open or closed as will be understood by those skilled in the art. The impeller is provided with baffles 17 for directing the gaseous fluid flow along the vane of the blower means 15. The motor 16 is carried on the wall 11 of the frame structure by rods 18 and ample free space is provided between the rods 18 and wall 11 to allow the gaseous fluid flow to pass upwardly towards the discharge connector 14.

In accordance with a fundamental feature of the present invention, the end region 21 of the fluid flow inlet connector 13 which is adjacent to the scrubber means 15 has a diminishing cross-sectional diameter which functions to accelerate the velocity of the incoming gaseous fluid flow before the latter enters the scrubber means 15. In the illustrated embodiment, the end region 21 of inlet connector 13 has a frusto-conical configuration as seen in the drawing.

According to another important feature of the present invention, the inlet connector 13 is provided with openings 22 through which a return flow of the scrubbing liquid passes for admission into the inlet connector 13. It should be particularly noted that the openings 22 are formed in a region of the inlet connector 13 where the gaseous fluid flow is not being accelerated. In the illustrated preferred embodiment, the openings 22 are formed in the region of inlet connector 13 just prior to the diminishing cross-sectional diameter portion thereof in the direction of flow of the gaseous fluid so that the return flow of the scrubbing liquid enters into the inlet connector 13 before the gaseous fluid flow begins its acceleration.

The scrubbing liquid inlet connector 20 passes through the wall of the fluid flow inlet connector 13 and is directed therewithin so that its discharge orifice is directed toward the scrubber means 15.

The operation of the apparatus 10 of the present invention will now be described. The gaseous fluid flow having been pre-purified in the pretreatment section 19 enters into the inlet connector 13 where it flows in a rotary direction about a vertical axis at an initial velocity. For example, the initial velocity of the gaseous fluid flow at the point designated A may be about 7-12 m/s. As the gaseous fluid flow passes through the conical end region 21 of the connector 13, its velocity increases by virtue of the diminishing cross-sectional diameter thereof so that it reaches an increased velocity, e.g., about 20-25 m/s at the point designated B. At this point, the scrubbing liquid is introduced through the connector 20 and directed into the gaseous fluid flow whereupon the blower means 15 accelerates the gaseous fluid flow and the scrubbing liquid from its velocity at point B to an increased velocity, e.g., 60-100 m/s, at the point designated C. After the acceleration of the gaseous fluid flow, droplets separate therefrom and the velocity of the gaseous fluid flow drops to such an extent in the frame structure that the droplets will separate and run down along the wall 11 to the bottom 12 of the frame structure and then into the apertures or openings 22 into the inlet connector 13. In this manner, an extremely high scrubbing efficiency is achieved utilizing a blower means 15 as the scrubber means which operates at low power outputs and which does not require high energy inputs.

The openings 22 formed in the inlet connector 13 are appropriately shaped so that the return flow of the scrubbing fluid passing therethrough is directed so as to rotate within the inlet connector 13 with the same sense of rotation but in the opposite direction as the gaseous fluid flow progressing upwardly therein so that the scrubbing fluid return flow as it flows downwardly in the inlet connector 13 passes perpendicularly to the upwardly flowing gaseous fluid flow thereby effecting an extremely efficient prescrubbing of the gaseous fluid flow within the inlet connector 13. The downwardly flowing scrubbing liquid in the illustrated embodiment then flows into a preseparator which possibly incorporates a liquid collection tank.

Preferably, the blower means 15 constituting the scrubbing means is constructed so that as the fluid flow is accelerated, a portion of the purified fluid flow is recycled back through the openings 22 in the inlet connector 13 into the latter. The rotational fluid flow drives the liquid droplets which are flung outwardly by the blower means 15 towards the openings 22 and causes the scrubbing liquid to obtain a rotary motion within the inlet connector 13.

It is understood that the scrubber means 15 of the present invention need not be constituted by the particular device discussed above. For example, rotary power to the impeller may be provided by means of a motor situated externally of the apparatus or by a belt transmission or by a hydraulic motor. The motor 16 may also be completely isolated from the gaseous fluid flow by providing the same with appropriate covering protective shields. In this case, it is possible to cool the motor using an external air current. The discharge connector 14 can have any suitable construction and, moreover, an additional droplet separator may be provided in order to insure optimum droplet separation. Still further, the conical end region of connector 13 may be replaced by a constricted aperture through which the gaseous fluid flow is directed to increase its velocity prior to the same flowing to the impeller of the blower means 15.

Obviously, numerous modifications and variations of the present invention are possible in the light of the above teachings. It is therefore to be understood that within the scope of the claims appended hereto, the invention may be practiced otherwise than as specifically disclosed herein.

What is claimed is:

1. Apparatus for removing gaseous components and/or solid impurities from a gaseous fluid flow, comprising:
    a frame structure;
    scrubber means disposed within said frame structure;
    discharge means through which the purified gaseous fluid flow is discharged from said frame structure;
    means for introducing scrubbing liquid into said apparatus and directing the scrubbing liquid into contact with said gaseous fluid flow;
    fluid flow inlet means communicating with said frame structure through which said gaseous fluid flow is introduced into said frame structure towards said scrubber means, said fluid flow inlet means having a region through which the gaseous fluid flow rate is not accelerated and another region through which the flow rate is not accelerated and another region through which the flow rate of the gaseous fluid flow passing through said inlet means is increased prior to said scrubber means;
    opening means situated in said inlet means through which a return flow of the scrubbing liquid passes to enter into said inlet means and pass therethrough in opposition to the direction of the gaseous fluid flow, said opening means disposed in said region of said inlet means where the flow rate of the gaseous fluid flow is not accelerated and shaped and disposed to direct the scrubbing liquid return flow in said inlet means in a direction opposite to the direction of gaseous fluid flow and so that the scrubbing liquid return flow is not entrained in the gaseous fluid flow.

2. The apparatus of claim 1 wherein said fluid flow inlet means has a flow discharge orifice directed towards said scrubber means and wherein a discharge end portion of said scrubbing liquid inlet means is disposed within said fluid flow inlet means in the direction of said scrubber means to direct the scrubbing liquid towards said discharge orifice of said fluid flow inlet means.

3. The apparatus of claim 1 wherein said scrubbing means comprises blower means for further accelerating the already accelerated fluid flow discharge from said fluid flow inlet means and for directing a part of the purified fluid flow in the form of a recirculating flow through said opening means provided in said fluid flow inlet means and into the latter, said blower means being positioned and arranged so as to separate droplets out of said fluid flow.

4. The apparatus of claim 3 wherein said blower means comprises means for flinging droplets towards said opening means in a manner so that the scrubbing liquid passing through said opening means into said fluid flow inlet means is set into rotary motion within said fluid flow inlet means, whereby an efficient pre-purifying of the fluid flow is obtained in said fluid flow inlet means progressing in the direction opposite to the direction of the flow of the gaseous fluid flow therein.

5. The apparatus of claim 1 wherein said end region of said fluid flow inlet means has a substantially frusto-conical configuration tapering in the direction towards said scrubber means.

6. The apparatus of claim 1 additionally comprising:
    means for directing the gaseous fluid flow through said inlet means in a substantially rotational manner about a vertical axis of said inlet means, and
    in which said opening means directs said return flow of the scrubbing liquid into said inlet means in a rotational direction substantially the same as the rotational direction of said gaseous fluid flow.

* * * * *